(12) United States Patent
Kim et al.

(10) Patent No.: US 12,494,233 B2
(45) Date of Patent: Dec. 9, 2025

(54) SEMICONDUCTOR DEVICE AND OPERATING METHOD OF SEMICONDUCTOR DEVICE

(71) Applicant: SK hynix Inc., Icheon-si (KR)

(72) Inventors: Do Hong Kim, Icheon-si (KR); Kwang Soo Kim, Icheon-si (KR); Duck Hwa Hong, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 175 days.

(21) Appl. No.: 18/473,667

(22) Filed: Sep. 25, 2023

(65) Prior Publication Data

US 2024/0395291 A1    Nov. 28, 2024

(30) Foreign Application Priority Data

May 24, 2023  (KR) .......... 10-2023-0066803

(51) Int. Cl.
*G11C 7/08*  (2006.01)
*G11C 7/06*  (2006.01)

(52) U.S. Cl.
CPC ............... *G11C 7/08* (2013.01); *G11C 7/065* (2013.01)

(58) Field of Classification Search
CPC .. G11C 7/08; G11C 7/065; G11C 7/12; G11C 7/06; G11C 7/22; G11C 11/4076; G11C 11/4091
See application file for complete search history.

(56) References Cited

U.S. PATENT DOCUMENTS

2017/0069368 A1 * 3/2017 Woo ............... G11C 11/4094
2020/0372948 A1   11/2020 Kim et al.
2022/0157369 A1 * 5/2022 Kim ............... G11C 11/4094

FOREIGN PATENT DOCUMENTS

KR    1020030033550 A   5/2003

* cited by examiner

*Primary Examiner* — Xiaochun L Chen
(74) *Attorney, Agent, or Firm* — WILLIAM PARK AND ASSOCIATIES LTD.

(57) ABSTRACT

Disclosed is a semiconductor device including a first cell mat including memory cells connected to a first bit line, a second cell mat including memory cells connected to a second bit line, a sense amplifier configured to amplify a difference in voltages between the first bit line and the second bit line, and a control circuit configured to differently adjust timing at which the first bit line and the second bit line are connected to or disconnected from the sense amplifier.

18 Claims, 10 Drawing Sheets

SEMICONDUCTOR DEVICE AND OPERATING METHOD OF SEMICONDUCTOR DEVICE

CROSS-REFERENCE TO RELATED APPLICATION(S)

This application claims priority under 35 U.S.C. § 119 (a) to Korean Patent Application No. 10-2023-0066803, filed on May 24, 2023, in the Korean Intellectual Property Office, the disclosure of which is incorporated herein by reference in its entirety.

BACKGROUND

1. Technical Field

Various embodiments of the present disclosure generally relate to integrated circuit technology, and more particularly, to a semiconductor device and an operating method of the semiconductor device.

2. Related Art

With the recent trend of electronic appliances toward miniaturization, low power consumption, high performance, and diversification, semiconductor devices capable of storing information in various electronic appliances such as a computer and a portable communication device have been demanded. Semiconductor devices may be largely classified into volatile memory devices and non-volatile memory devices. Volatile memory devices have a high data processing speed, but power must be continuously supplied to retain stored data, whereas non-volatile memory devices do not need to be continuously supplied with power to retain stored data, but have a low data processing speed.

Continuous research is being conducted to increase data processing speeds of volatile memory devices and improve reliability of data processing.

SUMMARY

In accordance with an embodiment, a semiconductor device may include: a first cell mat including memory cells connected to a first bit line; a second cell mat including memory cells connected to a second bit line; a sense amplifier configured to amplify a difference in voltages between the first bit line and the second bit line; and a control circuit configured to differently adjust timing at which the first bit line and the second bit line are connected to the sense amplifier.

In accordance with an embodiment, a semiconductor device may include: a first cell mat including memory cells connected to a first bit line; a second cell mat including memory cells connected to a second bit line; a sense amplifier configured to amplify a difference in voltages between the first bit line and the second bit line; and a control circuit configured to differently adjust timing at which the first bit line and the second bit line are disconnected from the sense amplifier.

In accordance with an embodiment, a semiconductor device may include: a sense amplifier configured to perform an amplification operation of amplifying a difference in voltages between a first bit line and a second bit line and a mismatch compensation operation; and a control circuit configured to control each of the first and second bit lines to be disconnected from the sense amplifier at different timings during the mismatch compensation operation.

In accordance with an embodiment, a semiconductor device may include: a sense amplifier configured to perform an amplification operation of amplifying a difference in voltages between a first bit line and a second bit line and a mismatch compensation operation; and a control circuit configured to control each of the first and second bit lines to be connected to the sense amplifier at different timings during the amplification operation.

In accordance with an embodiment, an operating method of a semiconductor device may include: activating a sense amplifier while a word line is disabled; disconnecting each of a first bit line and a second bit line from the sense amplifier at different timings; activating the sense amplifier again while the word line is enabled; and connecting each of the first and second bit lines to the sense amplifier at different timings.

DETAILED DESCRIPTION

Various embodiments of the present disclosure are directed to a semiconductor device capable of controlling connection or disconnection timing of a sense amplifier and each of a pair of bit lines, and an operating method of the semiconductor device.

According to embodiments of the present disclosure, it is possible to compensate for a mismatch of a sense amplifier and improve an offset related to a sensing margin.

Hereinafter, various embodiments according to the technical spirit of the present disclosure are described below with reference to the accompanying drawings. It will be understood that when an element or layer etc., is referred to as being "on," "connected to" or "coupled to" another element or layer etc., it can be directly on, connected or coupled to the other element or layer etc., or intervening elements or layers etc., may be present. In contrast, when an element or layer etc., is referred to as being "directly on," "directly connected to" or "directly coupled to" another element or layer etc., there are no intervening elements or layers etc., present. It will be understood that although the terms "first," "second," "third," etc. are used herein to describe various elements, these elements should not be limited by these terms. These terms are only used to distinguish one element from another element and are not intended to imply an order or number of elements. Thus, a first element in some embodiments could be termed a second element in other embodiments without departing from the teachings of the present disclosure.

Figure 1:
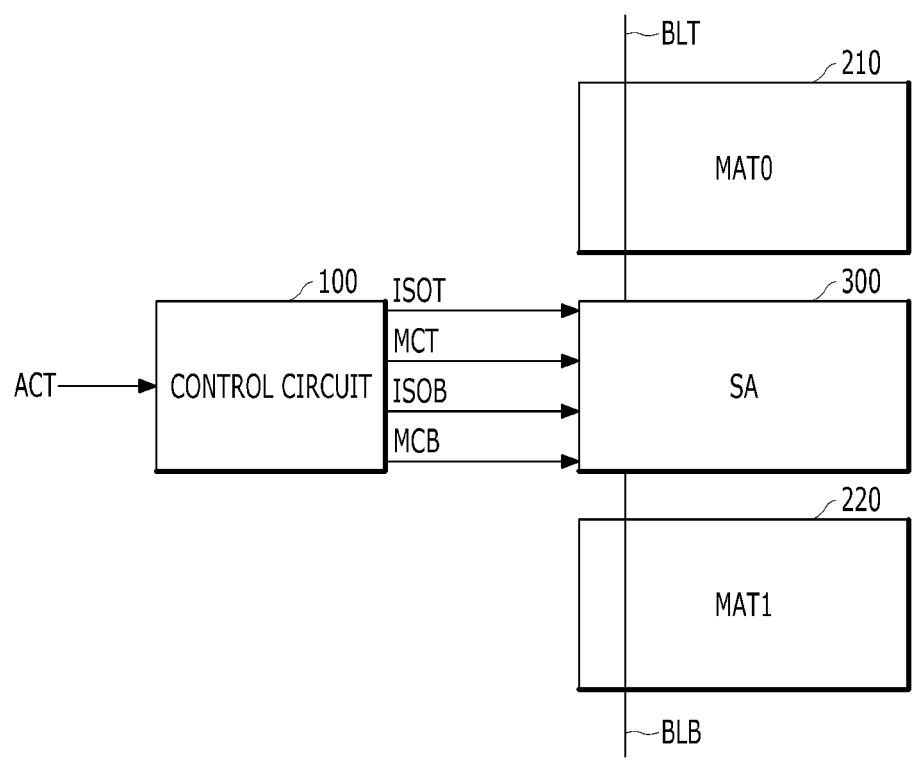
FIG. 1 is a block diagram illustrating a configuration of a semiconductor device in accordance with an embodiment.

FIG. 1 is a block diagram illustrating a configuration of a semiconductor device in accordance with an embodiment.

Referring to FIG. 1, the semiconductor device according to the present embodiment may include a control circuit 100, a first cell mat 210, a second cell mat 220, and a sense amplifier 300.

The control circuit 100 may generate one or more of a first data transfer signal ISOT, a second data transfer signal ISOB, a first compensation signal MCT, and a second compensation signal MCB on the basis of an active signal ACT. For example, when the active signal ACT is enabled, the control circuit 100 may generate the first data transfer signal ISOT and the second data transfer signal ISOB that are enabled at different timings. In addition, when the active signal ACT is enabled, the control circuit 100 may generate the first compensation signal MCT and the second compensation signal MCB that are disabled at different timings. In this case, the active signal ACT may be a signal generated by an active command received from an external controller that controls the semiconductor device.

Each of the first cell mat 210 (i.e., MAT0) and the second cell mat 220 (i.e. MAT1) may include a plurality of memory cells. In this case, each of the plurality of memory cells may be connected to a word line and bit lines. According to the present embodiment, FIG. 1 illustrates the first cell mat 210 including memory cells connected to a first bit line BLT and the second cell mat 220 including memory cells connected to a second bit line BLB.

The sense amplifier 300 may be connected to or disconnected from each of the first bit line BLT and the second bit line BLB on the basis of the first data transfer signal ISOT, the second data transfer signal ISOB, the first compensation signal MCT, and the second compensation signal MCB. For example, the sense amplifier 300 may be connected to the first bit line BLT when either one of the first data transfer signal ISOT and the first compensation signal MCT is enabled. The sense amplifier 300 may be connected to the second bit line BLB when either one of the second data transfer signal ISOB and the second compensation signal MCB is enabled.

Figure 2:
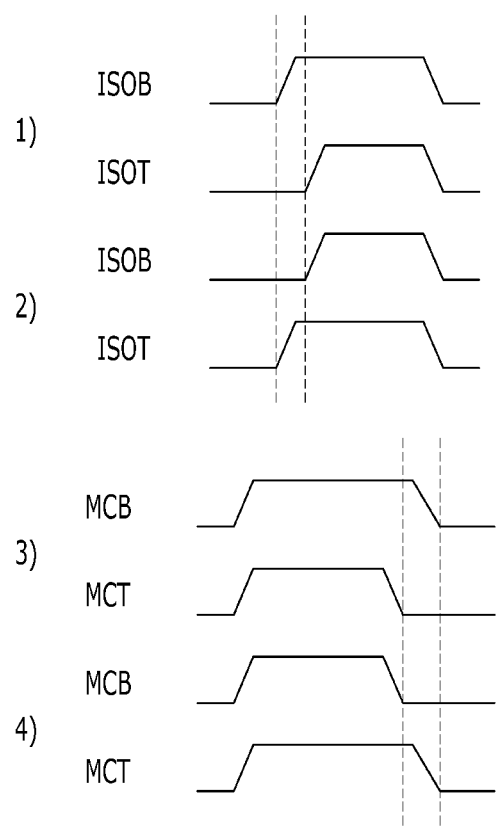
FIG. 2 is a timing diagram illustrating an operation of a semiconductor device in accordance with an embodiment.

FIG. 2 is a timing diagram illustrating an operation of the semiconductor device in accordance with an embodiment.

Referring to FIG. 2, the control circuit 100 may generate the first and second data transfer signals ISOT and ISOB having different enable timings, on the basis of the active signal ACT. In addition, the control circuit 100 may generate the first and second compensation signals MCT and MCB having different disable timings, on the basis of the active signal ACT. FIG. 2 illustrates, as an example, the first data transfer signal ISOT, the second data transfer signal ISOB, the first compensation signal MCT, and the second compensation signal MCB that are enabled at a high level and disabled at a low level, but the present disclosure is not limited thereto.

Referring to 1) of FIG. 2, the control circuit 100 may generate the first data transfer signal ISOT, which is enabled later than the second data transfer signal ISOB, on the basis of the active signal ACT. In this case, disable timings of the first and second data transfer signals ISOT and ISOB may be the same.

Referring to 2) of FIG. 2, the control circuit 100 may generate the second data transfer signal ISOB, which is enabled later than the first data transfer signal ISOT, on the basis of the active signal ACT. In this case, disable timings of the first and second data transfer signals ISOT and ISOB may be the same.

Referring to 3) of FIG. 2, the control circuit 100 may generate the second compensation signal MCB, which is disabled later than the first compensation signal MCT. In this case, enable timings of the first and second compensation signals MCT and MCB may be the same.

Referring to 4) of FIG. 2, the control circuit 100 may generate the first compensation signal MCT, which is disabled later than the second compensation signal MCB. In this case, enable timings of the first and second compensation signals MCT and MCB may be the same.

The control circuit 100 of the semiconductor device according to the present embodiment may generate the first and second data transfer signals ISOT and ISOB having different enable timings, and control the sense amplifier 300 to be connected to each of the first and second bit lines BLT and BLB at different timings. In addition, the control circuit 100 of the semiconductor device according to the present embodiment may generate the first and second compensation signals MCT and MCB having different disable timings, and control the sense amplifier 300 to be disconnected from each of the first and second bit lines BLT and BLB at different timings. 1) and 2) of FIG. 2 each illustrate the first and second data transfer signals ISOT and ISOB having different enable timings as an example, and 3) and 4) of FIG. 2 each illustrate the first and second compensation signals MCT and MCB having different disable timings as an example.

Figure 3:
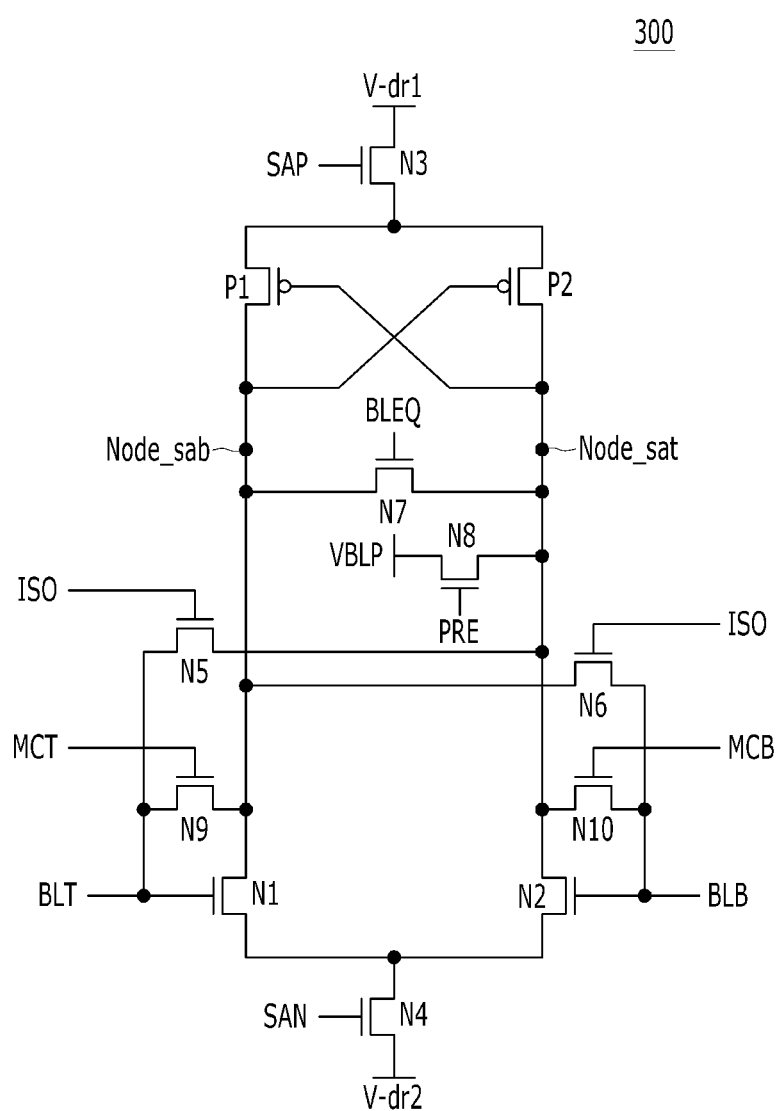
FIG. 3 is a circuit diagram illustrating a configuration of a sense amplifier in accordance with an embodiment.

FIG. 3 is a circuit diagram illustrating a configuration of the sense amplifier 300 in accordance with an embodiment.

Referring to FIG. 3, the sense amplifier 300 according to the present embodiment may be controlled by a data transfer signal ISO and the first and second compensation signals MCT and MCB having different disable timings.

The sense amplifier 300 may include first to $12^{th}$ transistors N1, N2, P1, P2, N3, N4, N5, N6, N7, N8, N9, and N10.

The first bit line BLT may be connected to a gate of the first transistor N1, and a first internal node Node_sab may be connected to a drain of the first transistor N1.

The second bit line BLB may be connected to a gate of the second transistor N2, and a second internal node Node_sat may be connected to a drain of the second transistor N2. In this case, a source of the first transistor N1 may be connected to a source of the second transistor N2.

The second internal node Node_sat may be connected to a gate of the third transistor P1, and the first internal node Node_sab may be connected to a drain of the third transistor P1.

The first internal node Node_sab may be connected to a gate of the fourth transistor P2, and the second internal node Node_sat may be connected to a drain of the fourth transistor P2. In this case, a source of the third transistor P1 may be connected to a source of the fourth transistor P2.

A first driving signal SAP may be input to a gate of the fifth transistor N3, a first driving voltage V_dr1 may be applied to a drain of the fifth transistor N3, and nodes connected to the sources of the third and fourth transistors P1 and P2 may be connected to a source of the fifth transistor N3.

A second driving signal SAN may be input to a gate of the sixth transistor N4, nodes connected to the sources of the first and second transistors N1 and N2 may be connected to a drain of the sixth transistor N4, and a second driving voltage V_dr2 may be applied to a source of the sixth transistor N4. In this case, the first and second driving voltages V_dr1 and V_dr2 may be voltages for driving the sense amplifier 300, and the first driving voltage V_dr1 may have a higher level than the second driving voltage V_dr2.

The data transfer signal ISO may be input to a gate of the seventh transistor N5, and the first bit line BLT and the second internal node Node_sat may be connected to a drain and a source of the seventh transistor N5, respectively.

The data transfer signal ISO may be input to a gate of the eighth transistor N6, and the second bit line BLB and the first internal node Node_sab may be connected to a drain and a source of the eighth transistor N6, respectively.

A bit line equalizer signal BLEQ may be input to a gate of the ninth transistor N7, and the first internal node Node_sab and the second internal node Node_sat may be connected to a drain and a source of the ninth transistor N7, respectively.

A precharge signal PRE may be input to a gate of the 10$^{th}$ transistor N8, a bit line precharge voltage VBLP may be applied to a drain of the 10$^{th}$ transistor N8, and the second internal node Node_sat may be connected to a source of the 10$^{th}$ transistor N8.

The first compensation signal MCT may be input to a gate of the 11$^{th}$ transistor N9, and the first bit line BLT and the first internal node Node_sab may be connected to a drain and a source of the 11$^{th}$ transistor N9, respectively.

The second compensation signal MCB may be input to a gate of the 12$^{th}$ transistor N10, and the second bit line BLB and the second internal node Node_sat may be connected to a drain and a source of the 12$^{th}$ transistor N10, respectively.

The sense amplifier 300 which has the above-described configuration may operate as follows.

When the first and second driving signals SAP and SAN are enabled, the fifth and sixth transistors N3 and N4 may be turned on, so that the sense amplifier 300 may receive the first and second driving voltages V_dr1 and V_dr2. That is, during a period in which the first and second driving signals SAP and SAN are enabled and the first and second driving voltages V_dr1 and V_dr2 are applied, the sense amplifier 300 may be activated.

When the first and second compensation signals MCT and MCB are enabled, the 11$^{th}$ and 12$^{th}$ transistors N9 and N10 may be turned on, so that the first bit line BLT and the first internal node Node_sab may be connected to the 11$^{th}$ transistor N9, and the second bit line BLB and the second internal node Node_sat may be connected to the 12$^{th}$ transistor N10. In this case, the activated sense amplifier 300 may perform a mismatch compensation operation during a period in which the first and second compensation signals MCT and MCB are enabled. Among the transistors illustrated in FIG. 3 constituting the sense amplifier 300, even transistors having the same type and formed through the same process may have different threshold voltages. In particular, when a mismatch in which the threshold voltages of the first and second transistors N1 and N2 among the first to fourth transistors N1, N2, P1, and P2 that perform an amplification operation are different occurs or a mismatch occurs between the third and fourth transistors P1 and P2, the sense amplifier 300 may malfunction. Accordingly, in order to compensate for a mismatch between transistors having the same type, the sense amplifier 300 may be configured to perform the mismatch compensation operation.

When the first and second data transfer signals ISOT and IOSB are enabled, the seventh and eighth transistors N5 and N6 may be turned on, so that the first bit line BLT and the second internal node Node_sat may be connected to the seventh transistor N5, and the second bit line BLB and the first internal node Node_sab may be connected to the eighth transistor N6. In this case, the activated sense amplifier 300 may perform the amplification operation of amplifying a difference in voltages between the first and second bit lines BLT and BLB during a period in which the first and second data transfer signals ISOT and ISOB are enabled.

Figure 4:
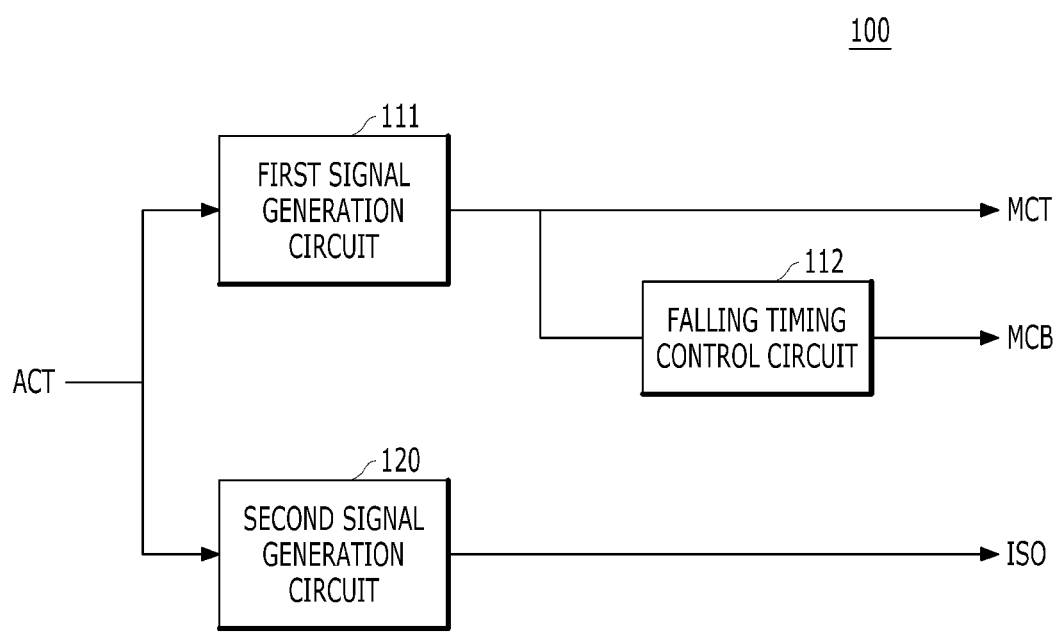
FIG. 4 is a block diagram illustrating a configuration of a control circuit for controlling a sense amplifier in accordance with an embodiment.

FIG. 4 is a block diagram illustrating a configuration of the control circuit 100 for controlling the sense amplifier 300 in accordance with an embodiment. As illustrated in 4) of FIG. 2, the control circuit 100 illustrated in FIG. 4 may illustrate, as an example, a configuration in which the disable timing of the first compensation signal MCT is adjusted to be later than the disable timing of the second compensation signal MCB.

Referring to FIG. 4, the control circuit 100 may include a first signal generation circuit 111, a falling timing control circuit 112, and a second signal generation circuit 120.

The first signal generation circuit 111 may generate the first compensation signal MCT, which is enabled during a first setting period, on the basis of the active signal ACT. In this case, the first compensation signal MCT is described as an example of a signal enabled at a high level.

The falling timing control circuit 112 may generate the second compensation signal MCB having the disable timing earlier than falling timing, that is, the disable timing, of the first compensation signal MCT, on the basis of the first compensation signal MCT. For example, the falling timing control circuit 112 may generate the second compensation signal MCB having the same enable timing as rising timing, that is, the enable timing, of the first compensation signal MCT, and the disable timing earlier than the falling timing, that is, the disable timing, of the first compensation signal MCT.

The second signal generation circuit 120 may generate the data transfer signal ISO, which is enabled during a second setting period, on the basis of the active signal ACT. In this case, the data transfer signal ISO is described as an example of a signal enabled at a high level. The second setting period may have the same length as or different length from the first setting period.

Figure 5:
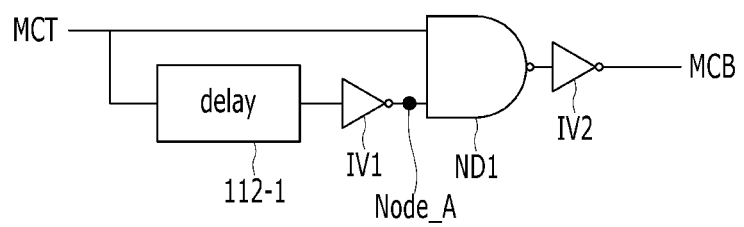
FIG. 5 is a diagram illustrating a configuration and operation of a falling timing control circuit illustrated in FIG. 4.
Figure 5:
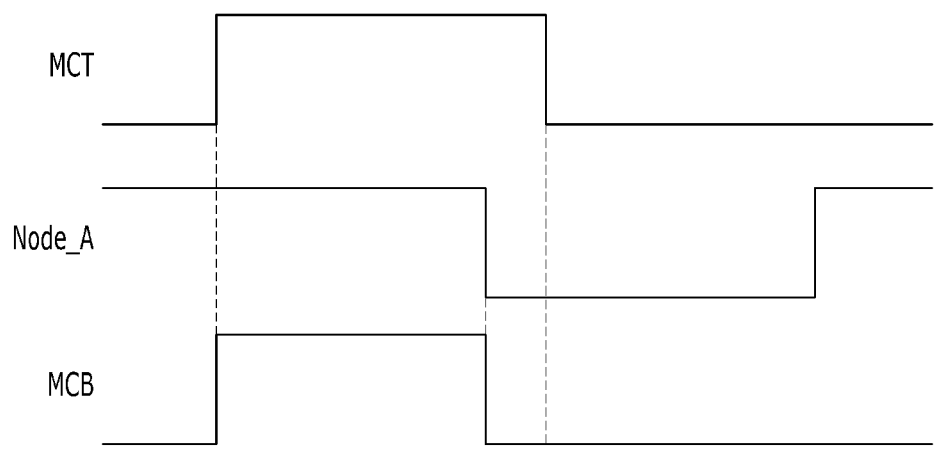

FIG. 5 is a diagram illustrating a configuration and operation of the falling timing control circuit 112 illustrated in FIG. 4.

As described above, the falling timing control circuit 112 may generate the second compensation signal MCB having the same enable timing as the enable timing of the first compensation signal MCT and the disable timing earlier than the disable timing of the first compensation signal MCT.

Referring to FIG. 5, the falling timing control circuit 112 may include a delay 112-1, a first inverter IV1, a NAND gate ND1, and a second inverter IV2.

The delay 112-1 may receive the first compensation signal MCT. The delay 112-1 may delay the received first compensation signal MCT, and output the delayed signal.

The first inverter IV1 may receive the output signal of the delay 112-1. The first inverter IV1 may invert the output signal of the delay 112-1. The first inverter IV1 may output the inverted signal to the NAND gate ND1.

The NAND gate ND1 may receive the first compensation signal MCT and the output signal of the first inverter IV1. The NAND gate ND1 may perform a NAND operation on the basis of the received first compensation signal MCT and the output signal of the first inverter IV1. The NAND gate ND1 may output a result of the NAND operation as an output signal to the second inverter IV2.

The second inverter IV2 may receive the output signal of the NAND gate ND1. The second inverter IV2 may invert the output signal of the NAND gate ND1. The second inverter IV2 may output the inverted signal as the second compensation signal MCB.

As illustrated in the lower timing diagram of FIG. 5, the first compensation signal MCT may be a signal that is enabled at a high level during the first setting period.

A signal waveform of a node Node_A may be the output signal of the first inverter IV1. Accordingly, the signal waveform of the node Node_A may be an inverted signal waveform obtained by delaying the first compensation signal MCT.

The second compensation signal MCB may be an output signal of the second inverter IV2 receiving the output signal of the NAND gate ND1 receiving the first compensation signal MCT and the output signal of the first inverter IV1. Therefore, the second compensation signal MCB may be the same as a signal according to a result of an AND operation performed on the first compensation signal MCT and the output signal of the first inverter IV1. That is, the second compensation signal MCB may be a signal that is enabled at a high level only in a period in which both of the first compensation signal MCT and the output signal of the first inverter IV1 are at a high level.

Accordingly, the second compensation signal MCB may be generated as a signal that is enabled at a high level only in a period in which both of the first compensation signal MCT and the signal waveform of the node Node_A are at a high level.

Consequently, the falling timing control circuit 112 may generate the second compensation signal MCB that is enabled at the same timing as the first compensation signal MCT and disabled at timing earlier than the disable timing of the first compensation signal MCT.

Although FIGS. 4 and 5 illustrate the first and second compensation signals MCT and MCB having the same enable timing and disable timing as illustrated in 4) of FIG. 2, the implementing of the configuration in which the first and second compensation signals MCT and MCB having the same enable timing and disable timing as illustrated in 3) of FIG. 2 are generated with reference to FIGS. 4 and 5 is nothing more than a design change.

Figure 6:
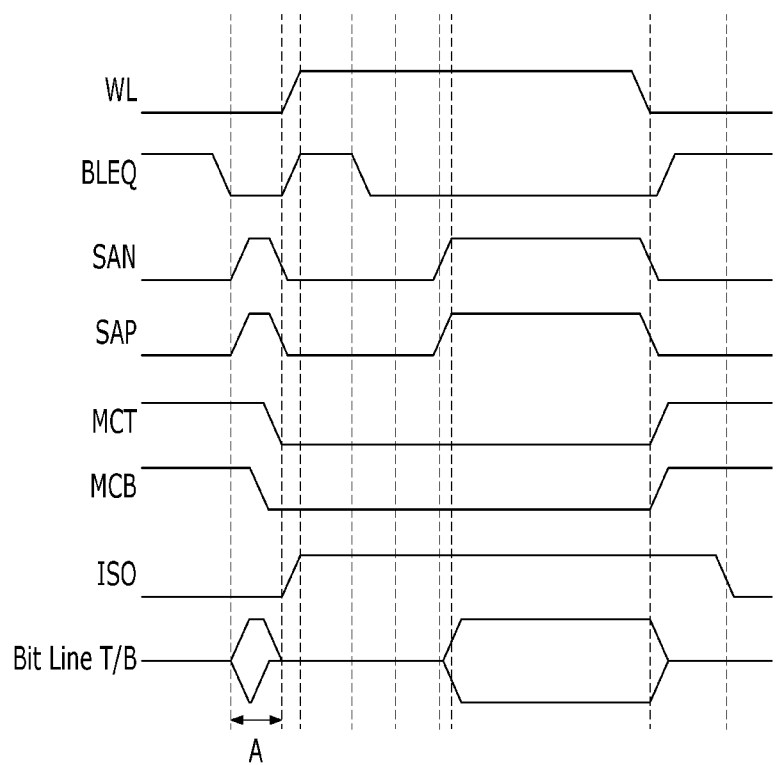
FIG. 6 is a timing diagram illustrating an operation of a sense amplifier in accordance with an embodiment.

FIG. 6 is a timing diagram illustrating an operation of the sense amplifier 300 in accordance with an embodiment.

FIG. 6 may be a timing diagram illustrating an operation of the sense amplifier 300 after an active command is received. In this case, a cell mat may include memory cells connected to a word line and each of bit lines. The cell mat may include a plurality of memory cells. The memory cells may be configured to be electrically connected to the bit lines when the word line is enabled. Accordingly, when data is stored in the memory cells or data stored in the memory cells is output, the word line may be enabled to electrically connect the memory cells to the bit lines. Therefore, when the word line is enabled, the sense amplifier 300 may perform an operation of sensing, amplifying and outputting the data stored in the memory cells, or storing the data in the memory cells, through the bit lines.

In addition, the mismatch compensation operation may be performed by activating the sense amplifier 300 before the word line is enabled.

Referring to FIGS. 3 and 6, the mismatch compensation operation may be performed by activating the sense amplifier 300. In order to activate the sense amplifier 300, while the first and second compensation signals MCT and MCB are enabled, that is, the first bit line BLT is connected to the first internal node Node_sab, and the second bit line BLB is connected to the second internal node Node_sat, the bit line equalizer signal BLEQ may be disabled so that the first internal node Node_sab and the second internal node Node_sat are electrically disconnected from the respective bit lines, and then the first and second driving signals SAP and SAN may be enabled at a high level.

Accordingly, a mismatch compensation operation period A of the sense amplifier 300 may be a period overlapping with a period in which the word line WL and the bit line equalizer signal BLEQ are disabled, and the first and second driving signals SAP and SAN are enabled during a period in which the first and second compensation signals MCT and MCB are enabled.

The control circuit 100 according to the present embodiment may generate the second compensation signal MCB having an earlier disable timing than the first compensation signal MCT. Accordingly, the $12^{th}$ transistor N10 may be turned off earlier than the 11th transistor N9. Therefore, in the mismatch compensation operation period A, the second bit line BLB and the second internal node Node_sat may be electrically disconnected earlier than the first bit line BLT and the first internal node Node_sab.

Accordingly, the mismatch compensation operation on the second transistor N2 among the first and second transistors N1 and N2 performing the amplification operation of the sense amplifier 300 may terminate earlier than the mismatch compensation operation on the first transistor N1.

Consequently, when the first transistor N1 among the first and second transistors N1 and N2 performing the amplification operation of the sense amplifier 300 has worse characteristics than the second transistor N2, the mismatch compensation operation may be controlled to be performed on the first transistor N1 for a longer time than the second transistor N2 having good characteristics.

On the other hand, those skilled in the art may change, in light of the present disclosure, the control circuit 100 to generate the first and second compensation signals MCT and MCB illustrated in 3) of FIG. 2 so that the mismatch compensation operation may be performed on the second transistor N2 for a longer time than the first transistor N1 having good characteristics when the second transistor N2 among the first and second transistors N1 and N2 performing the amplification operation of the sense amplifier 300 has worse characteristics than the first transistor N1.

The semiconductor device according to an embodiment of the present disclosure may perform the mismatch compensation operation according to a difference in characteristics of transistors for a mismatch, which causes malfunction of the sense amplifier, between the transistors, thereby improving an effect of the mismatch compensation operation of the sense amplifier.

Figure 7:
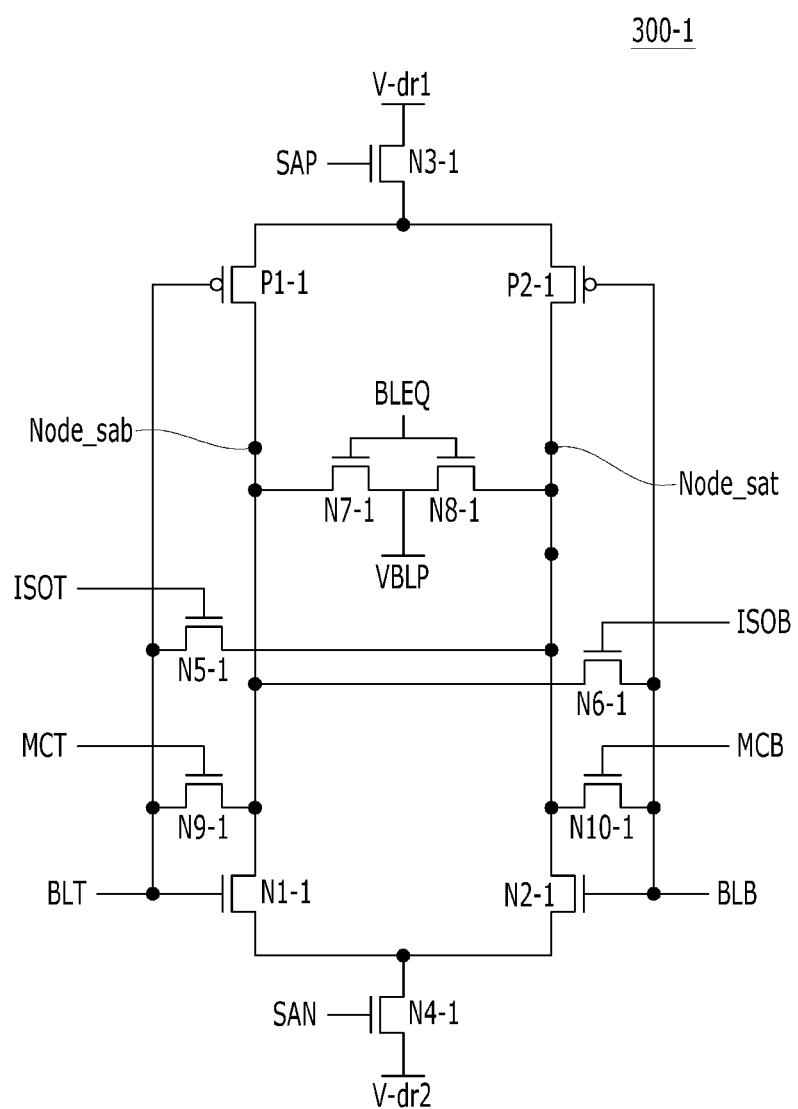
FIG. 7 is a circuit diagram illustrating a configuration of a sense amplifier in accordance with another embodiment.

FIG. 7 is a circuit diagram illustrating a configuration of a sense amplifier 300-1 in accordance with another embodiment.

Referring to FIG. 7, the sense amplifier 300-1 according to the present embodiment may be controlled by the first and second data transfer signals ISOT and ISOB having different enable timings and the first and second compensation signals MCT and MCB having different disable timings.

The sense amplifier 300-1 may include first to $12^{th}$ transistors N1-1, N2-1, P1-1, P2-1, N3-1, N4-1, N5-1, N6-1, N7-1, N8-1, N9-1, and N10-1.

The first bit line BLT may be connected to a gate of the first transistor N1-1, and a first internal node Node_sab may be connected to a drain of the first transistor N1-1.

The second bit line BLB may be connected to a gate of the second transistor N2-1, and a second internal node Node_sat may be connected to a drain of the second transistor N2-1. In this case, a source of the first transistor N1-1 may be connected to a source of the second transistor N2-1.

The first bit line BLT may be connected to a gate of the third transistor P1-1, and the first internal node Node_sab may be connected to a drain of the third transistor P1-1.

The second bit line BLB may be connected to a gate of the fourth transistor P2-1, and the second internal node Node_sat may be connected to a drain of the fourth transistor P2-1. In this case, a source of the third transistor P1-1 may be connected to a source of the fourth transistor P2-1.

A first driving signal SAP may be input to a gate of the fifth transistor N3-1, a first driving voltage V_dr1 may be applied to a drain of the fifth transistor N3-1, and nodes connected to the sources of the third and fourth transistors P1-1 and P2-1 may be connected to a source of the fifth transistor N3-1.

A second driving signal SAN may be input to a gate of the sixth transistor N4-1, a second driving voltage V_dr2 may be applied to a source of the sixth transistor N4-1, and nodes connected to the sources of the first and second transistors N1-1 and N2-1 may be connected to a drain of the sixth transistor N4-1. In this case, the first and second driving voltages V_dr1 and V_dr2 may be voltages for driving the sense amplifier 300-1, and the first driving voltage V_dr1 may have a higher level than the second driving voltage V_dr2.

The first data transfer signal ISOT may be input to a gate of the seventh transistor N5-1, and the first bit line BLT and the second internal node Node_sat may be connected to a drain and a source of the seventh transistor N5-1, respectively.

The second data transfer signal ISOB may be input to a gate of the eighth transistor N6-1, and the second bit line BLB and the first internal node Node_sab may be connected to a drain and a source of the eighth transistor N6-1, respectively.

A bit line equalizer signal BLEQ may be input to a gate of the ninth transistor N7-1, and the first internal node Node_sab and the $10^{th}$ transistor N8-1 may be connected to a drain and a source of the ninth transistor N7-1, respectively.

The bit line equalizer signal BLEQ may be input to a gate of the $10^{th}$ transistor N8-1, and the second internal node Node_sat and the ninth transistor N7-1 may be connected to a drain and a source of the $10^{th}$ transistor N8-1, respectively. In this case, a pre-charge voltage VBLP may be applied to a node to which the ninth and $10^{th}$ transistors N7-1 and N8-1 are connected.

The first compensation signal MCT may be input to a gate of the $11^{th}$ transistor N9-1, and the first bit line BLT and the first internal node Node_sab may be connected to a drain and a source of the $11^{th}$ transistor N9-1, respectively.

The second compensation signal MCB may be input to a gate of the $12^{th}$ transistor N10-1, and the second bit line BLB and the second internal node Node_sat may be connected to a drain and a source of the $12^{th}$ transistor N10-1, respectively.

The sense amplifier 300-1 which has the above-described configuration may operate as follows.

When the first and second driving signals SAP and SAN are enabled, the fifth and sixth transistors N3-1 and N4-1 may be turned on, so that the sense amplifier 300-1 may receive the first and second driving voltages V_dr1 and V_dr2. That is, during a period in which the first and second driving signals SAP and SAN are enabled and the first and second driving voltages V_dr1 and V_dr2 are applied, the sense amplifier 300-1 may be activated.

When the first and second compensation signals MCT and MCB are enabled, the $11^{th}$ and $12^{th}$ transistors N9-1 and N10-1 may be turned on, so that the first bit line BLT and the first internal node Node_sab may be connected to the $11^{th}$ transistor N9-1, and the second bit line BLB and the second internal node Node_sat may be connected to the $12^{th}$ transistor N10-1. In this case, the activated sense amplifier 300-1 may perform a mismatch compensation operation during a period in which the first and second compensation signals MCT and MCB are enabled. Among the transistors illustrated in FIG. 7 constituting the sense amplifier 300-1, even transistors having the same type and formed through the same process may have different threshold voltages. In particular, when a mismatch in which the threshold voltages of the first and second transistors N1-1 and N2-1 among the first to fourth transistors N1-1, N2-1, P1-1, and P2-1 that perform an amplification operation are different occurs or a mismatch occurs between the third and fourth transistors P1-1 and P2-1, the sense amplifier 300-1 may malfunction. Accordingly, in order to compensate for a mismatch between transistors having the same type, the sense amplifier 300-1 may be configured to perform the mismatch compensation operation.

When the first and second data transfer signals ISOT and IOSB are enabled, the seventh and eighth transistors N5-1 and N6-1 may be turned on, so that the first bit line BLT and the second internal node Node_sat may be connected to the seventh transistor N5-1, and the second bit line BLB and the first internal node Node_sab may be connected to the eighth transistor N6-1. In this case, the activated sense amplifier 300-1 may perform the amplification operation of amplifying a difference in voltages between the first and second bit lines BLT and BLB during a period in which the first and second data transfer signals ISOT and ISOB are enabled.

Figure 8:
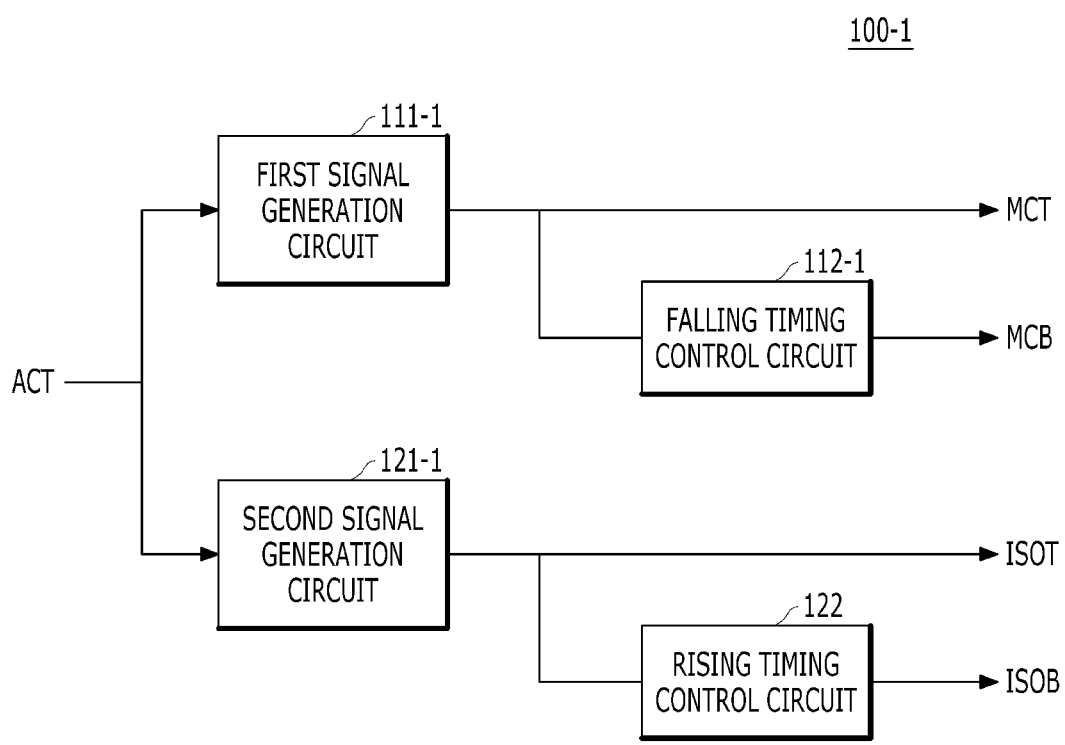
FIG. 8 is a block diagram illustrating a configuration of a control circuit for controlling a sense amplifier in accordance with another embodiment.

FIG. 8 is a block diagram illustrating a configuration of a control circuit 100-1 for controlling the sense amplifier 300-1 in accordance with another embodiment.

As illustrated in 2) and 4) of FIG. 2, the control circuit 100-1 illustrated in FIG. 8 may illustrate, as an example, a configuration in which the enable timing of the second transfer signal ISOB is adjusted to be later than the enable timing of the first data transfer signal ISOT, and the disable timing of the second compensation signal MCB is adjusted to be earlier than the disable timing of the first compensation signal MCT.

Referring to FIG. 8, the control circuit 100-1 may include a first signal generation circuit 111-1, a falling timing control circuit 112-1, a second signal generation circuit 121-1, and a rising timing control circuit 122.

The first signal generation circuit 111-1 may generate the first compensation signal MCT, which is enabled during a first setting period, on the basis of the active signal ACT. In this case, the first compensation signal MCT is described as an example of a signal enabled at a high level.

The falling timing control circuit 112-1 may generate the second compensation signal MCB having the disable timing earlier than falling timing, that is, the disable timing, of the first compensation signal MCT, on the basis of the first compensation signal MCT. For example, the falling timing control circuit 112-1 may generate the second compensation signal MCB having the same enable timing as rising timing, that is, the enable timing, of the first compensation signal MCT, and the disable timing earlier than the falling timing, that is, the disable timing, of the first compensation signal MCT.

The second signal generation circuit 121-1 may generate the first data transfer signal ISOT, which is enabled during a second setting period, on the basis of the active signal ACT. In this case, the first data transfer signal ISOT is described as an example of a signal enabled at a high level. The second setting period may have the same length as or different length from the first setting period.

The rising timing control circuit 122 may generate the second data transfer signal ISOB having the enable timing later than rising timing, that is, the enable timing, of the first data transfer signal ISOT, on the basis of the first data transfer signal ISOT. For example, the rising timing control circuit 122 may generate the second data transfer signal ISOB having the enable timing later than the rising timing, that is, the enable timing, of the first data transfer signal ISOT and the same disable timing as falling timing, that is, the disable timing, of the first data transfer signal ISOT.

Herein, a description of a configuration of the falling timing control circuit 112-1 is replaced with a description of the configuration of the falling timing control circuit 112 illustrated in FIG. 5, and a configuration of the rising timing control circuit 122 is described with reference to FIG. 9.

Figure 9:
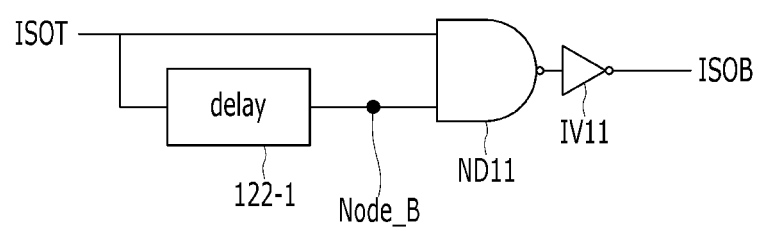
FIG. 9 is a diagram illustrating a configuration and operation of a rising timing control circuit illustrated in FIG. 8.
Figure 9:
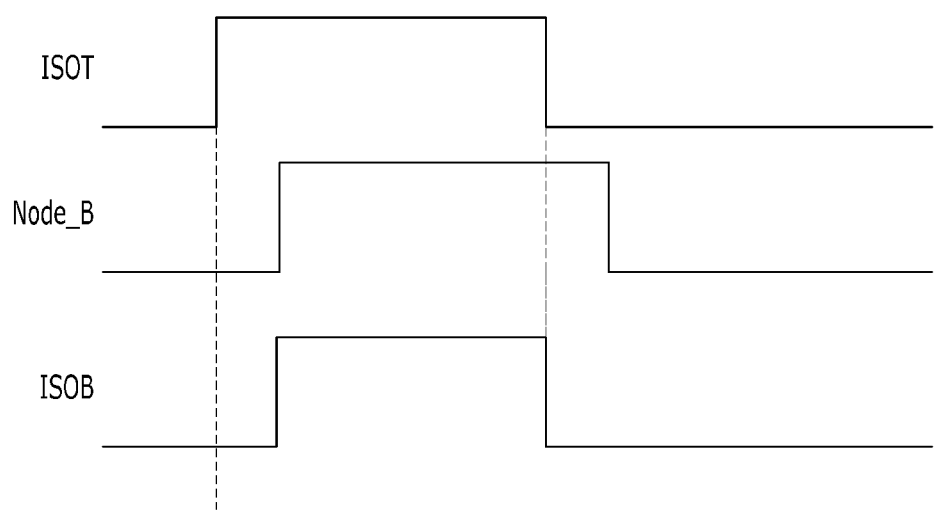

FIG. 9 is a diagram illustrating a configuration and operation of the rising timing control circuit 122 illustrated in FIG. 8.

As described above, the rising timing control circuit 122 may generate the second data transfer signal ISOB having the enable timing later than the enable timing of the first data transfer signal ISOT and the same disable timing as the disable timing of the first data transfer signal ISOT.

Referring to FIG. 9, the rising timing control circuit 122 may include a delay 122-1, a NAND gate ND11, and an inverter IV11.

The delay 122-1 may receive the first data transfer signal ISOT. The delay 122-1 may delay the received first data transfer signal ISOT, and output the delayed signal.

The NAND gate ND11 may receive the first data transfer signal ISOT and the output signal of the delay 122-1. The NAND gate ND11 may perform a NAND operation on the basis of the received first data transfer signal ISOT and the output signal of the delay 122-1. The NAND gate ND11 may output a result of the NAND operation as an output signal to the inverter IV11.

The inverter IV11 may receive the output signal of the NAND gate ND11. The inverter IV11 may invert the output signal of the NAND gate ND11. The inverter IV11 may output the inverted signal as the second data transfer signal ISOB.

As illustrated in the lower timing diagram of FIG. 9, the first data transfer signal ISOT may be a signal that is enabled at a high level during the second setting period.

A signal waveform of a node Node_B may be the output signal of the delay 122-1. Accordingly, the signal waveform of the node Node_B may be a waveform of a signal obtained by delaying the first data transfer signal ISOT.

The second data transfer signal ISOB may be an output signal of the inverter IV11 receiving the output signal of the NAND gate ND11 receiving the first data transfer signal ISOT and the output signal of the delay 122-1. Therefore, the second data transfer signal ISOB may be the same as a signal according to a result of an AND operation performed on the first data transfer signal ISOT and the output signal of the delay 122-1. That is, the second data transfer signal ISOB may be a signal that is enabled at a high level only in a period in which both of the first data transfer signal ISOT and the output signal of the delay 122-1 are at a high level.

Accordingly, the second data transfer signal ISOB may be generated as a signal that is enabled at a high level only in a period in which both of the first data transfer signal ISOT and the signal waveform of the node Node_B are at a high level.

Consequently, the rising timing control circuit 122 may generate the second data transfer signal ISOB having enable timing later than the enable timing of the first data transfer signal ISOT and disabled at the same timing as the first data transfer signal ISOT.

Although FIGS. 8 and 9 illustrate the first and second data transfer signals ISOT and ISOB having the same enable timing and disable timing as illustrated in 2) of FIG. 2, the implementing of the configuration in which the first and second data transfer signals ISOT and ISOB having the same enable timing and disable timing as illustrated in 1) of FIG. 2 are generated with reference to FIGS. 8 and 9 is nothing more than a design change.

Figure 10:
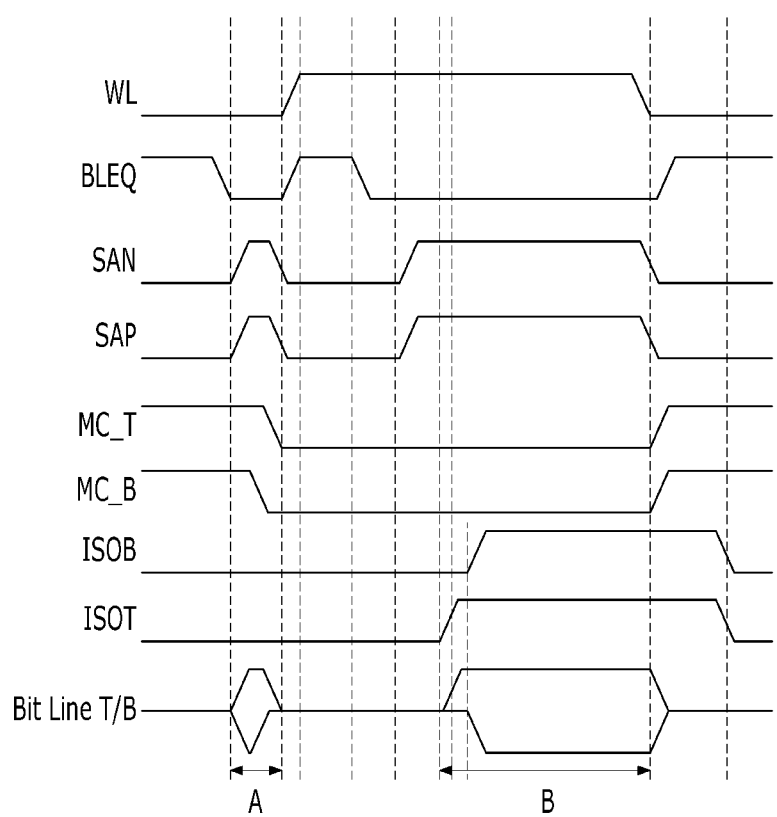
FIG. 10 is a timing diagram illustrating an operation of a sense amplifier in accordance with another embodiment.

FIG. 10 is a timing diagram illustrating an operation of the sense amplifier 300-1 in accordance with another embodiment.

FIG. 10 may be a timing diagram illustrating an operation of the sense amplifier 300-1 after an active command is received. In this case, a cell mat may include memory cells connected to a word line and each of bit lines. The cell mat may include a plurality of memory cells. The memory cells may be configured to be electrically connected to the bit lines when the word line is enabled. Accordingly, when data is stored in the memory cells or data stored in the memory cells is output, the word line may be enabled to electrically connect the memory cells to the bit lines. Therefore, when the word line is enabled, the sense amplifier 300-1 may perform an operation of sensing, amplifying and outputting the data stored in the memory cells, or storing the data in the memory cells, through the bit lines.

In addition, in an embodiment, the mismatch compensation operation may be performed by activating the sense amplifier 300-1 before the word line is enabled, which makes it possible to prevent or mitigate malfunction for the amplification operation of the sense amplifier 300-1 from occurring.

Referring to FIGS. 7 and 10, the mismatch compensation operation may be performed by activating the sense amplifier 300-1. In order to activate the sense amplifier 300-1, while the first and second compensation signals MCT and MCB are enabled, that is, the first bit line BLT is connected to the first internal node Node_sab, and the second bit line BLB is connected to the second internal node Node_sat, the bit line equalizer signal BLEQ may be disabled so that the first internal node Node_sab and the second internal node Node_sat are electrically disconnected from the respective bit lines, and then the first and second driving signals SAP and SAN may be enabled at a high level.

Accordingly, a mismatch compensation operation period A of the sense amplifier 300-1 may be a period overlapping with a period in which the word line WL and the bit line equalizer signal BLEQ are disabled, and the first and second driving signals SAP and SAN are enabled during a period in which the first and second compensation signals MCT and MCB are enabled.

The control circuit 100-1 according to the present embodiment may generate the second compensation signal MCB having an earlier disable timing than the first compensation signal MCT. Accordingly, the $12^{th}$ transistor N10 may be turned off earlier than the $11^{th}$ transistor N9. Therefore, in the mismatch compensation operation period A, the second bit line BLB and the second internal node Node_sat may be electrically disconnected earlier than the first bit line BLT and the first internal node Node_sab.

Accordingly, the mismatch compensation operation on the second transistor N2-1 among the first and second transistors N1-1 and N2-1 performing the amplification operation of the sense amplifier 300-1 may terminate earlier than the mismatch compensation operation on the first transistor N1-1.

Consequently, in an embodiment, when the first transistor N1-1 among the first and second transistors N1-1 and N2-1 performing the amplification operation of the sense amplifier 300-1 has worse characteristics than the second transistor N2-1, the mismatch compensation operation may be controlled to be performed on the first transistor N1-1 for a longer time than the second transistor N2-1 having good characteristics.

On the other hand, those skilled in the art may change, in light of the present disclosure, the control circuit 100-1 to generate the first and second compensation signals MCT and MCB illustrated in 3) of FIG. 2 so that the mismatch compensation operation may be performed on the second transistor N2-1 for a longer time than the first transistor N1-1 having good characteristics when the second transistor N2-1 among the first and second transistors N1-1 and N2-1 performing the amplification operation of the sense amplifier 300-1 has worse characteristics than the first transistor N1-1.

The semiconductor device according to an embodiment of the present disclosure may perform the mismatch compensation operation according to a difference in characteristics of transistors for a mismatch, which causes malfunction of the sense amplifier, between the transistors, thereby improving an effect of the mismatch compensation operation of the sense amplifier.

After the mismatch compensation operation is performed, the word line WL may be enabled.

While the word line WL is enabled, the first and second driving signals SAP and SAN may be enabled, and then the sense amplifier 300-1 may be activated.

When the first and second data transfer signals ISOT and ISOB are enabled at a high level while the sense amplifier 300-1 is activated, the sense amplifier 300-1 may perform the amplification operation.

In this case, the first internal node Node_sab of the activated sense amplifier 300-1 may be connected to the second bit line BLB through the $12^{th}$ transistor N10 that is turned on by the enabled second data transfer signal ISOB. In addition, the second internal node Node_sat of the activated sense amplifier 300-1 may be connected to the first bit line BLT through the $11^{th}$ transistor N9 that is turned on by the enabled first data transfer signal ISOT.

Therefore, the activated sense amplifier 300-1 may perform the amplification operation of amplifying the difference in voltages between the first and second bit lines BLT and BLB when the first and second data transfer signals ISOT and ISOB are enabled at a high level.

When the word line WL is enabled, and data of memory cells is transferred to the first bit line BLT, the difference in voltage levels between the first and second bit lines BLT and BLB may occur. Voltage levels of the first and second bit lines BLT and BLB may be transferred to the first and second internal nodes Node_sab and Node_sat when the first and second data transfer signals ISOT and ISOB are enabled. In this case, a difference in voltage levels between the first and second internal nodes Node_sab and Node_sat may occur, and the activated sense amplifier 300-1 may amplify the difference in voltage levels between the first and second internal nodes Node_sab and Node_sat. Because the sense amplifier 300-1 amplifies the difference in voltage levels between the first and second internal nodes Node_sab and Node_sat while the first and second data transfer signals ISOT and ISOB are enabled, that is, the first internal node Node_sab is connected to the second bit line BLB, and the second internal node Node_sat is connected to the first bit line BLB, the voltage levels of the first and second nodes Node_sab and Node_sat between which the difference in voltage levels is amplified may be transferred to the first and second bit lines BLT and BLB.

Consequently, the activated sense amplifier 300-1 may perform the amplification operation of amplifying the difference in voltage levels between the first and second bit lines BLT and BLB when the first and second data transfer signals ISOT and ISOB are enabled at a high level.

The control circuit 100-1 according to another embodiment of the present disclosure may generate different enable timings of the first and second data transfer signals ISOT and ISOB. As described above, the enable timing of the second data transfer signal ISOB may be later than that of the first data transfer signal ISOT. In this case, the timing at which the first bit line BLT and the second internal node Node_sat are connected by the first data transfer signal ISOT may be earlier than the timing at which the second bit line BLB and the first internal node Node_sab are connected by the second data transfer signal ISOB.

Therefore, the sense amplifier 300-1 under the control of the control circuit 100-1 according to another embodiment of the present disclosure may be controlled so that the voltage level of the first bit line BLT is first transferred to the second internal node Node_sat, and then the voltage level of the second bit line BLB is transferred to the first internal node Node_sab.

In conventional technology in which the voltage levels of the first and second bit lines BLT and BLB are simultaneously transferred to the first and second internal nodes Node_sab and Node_sat to secure the difference in voltages between the first and second bit lines BLT and BLB, the first and second internal nodes Node_sab and Node_sat do not fully receive the voltages of the first and second bit lines BLT and BLB due to a coupling phenomenon, which may cause amplification malfunction of the sense amplifier 300-1.

However, in the semiconductor device according to another embodiment of the present disclosure, the voltage levels of the first and second bit lines BLT and BLB are controlled to be transferred to the first and second internal nodes Node_sab and Node_sat at different timings. For this reason, in an embodiment, it may be advantageous to secure the difference in voltage levels between the first and second internal nodes Node_sab and Node_sat. Accordingly, in an embodiment, it is possible to prevent or mitigate the amplification malfunction of the sense amplifier 300-1.

Consequently, the semiconductor device according to an embodiment of the present disclosure may improve the effect of the mismatch compensation operation, and as the voltage levels of the bit lines are completely transferred to internal nodes, a sensing margin of the sense amplifier may be improved, and thus reliability of the semiconductor device may also be improved.

While the present disclosure has been illustrated and described with respect to specific embodiment, the disclosed embodiment is provided for the description, and not intended to be restrictive. Further, it is noted that the present disclosure may be achieved in various ways through substitution, change, and modification that fall within the scope of the following claims, as those skilled in the art will recognize in light of the present disclosure.

What is claimed is:

1. A semiconductor device comprising:
   a first cell mat including memory cells connected to a first bit line;
   a second cell mat including memory cells connected to a second bit line;
   a sense amplifier configured to amplify a difference in voltages between the first bit line and the second bit line; and
   a control circuit configured to differently adjust timing at which the first bit line and the second bit line are connected to the sense amplifier wherein the control circuit is configured to differently adjust timing at which the first bit line and the second bit line are disconnected from the sense amplifier.

2. The semiconductor device of claim 1, wherein the sense amplifier includes:
   a first internal node connected to one of the first and second bit lines; and
   a second internal node connected to the other one of the first and second bit lines.

3. The semiconductor device of claim 2, wherein the control circuit controls timing at which the first internal node is disconnected from one of the first and second bit lines to be different from timing at which the second internal node is disconnected from the other one of the first and second bit lines while a word line is disabled.

4. The semiconductor device of claim 3, wherein the control circuit controls timing at which the first internal node is connected to one of the first and second bit lines to be different from timing at which the second internal node is connected to the other one of the first and second bit lines while the word line is enabled.

5. The semiconductor device of claim 4, wherein the sense amplifier includes:
   a first transistor configured to connect or disconnect the first bit line to or from the second internal node;
   a second transistor configured to connect or disconnect the second bit line to or from the first internal node;
   a third transistor configured to connect or disconnect the first bit line to or from the first internal node; and
   a fourth transistor configured to connect or disconnect the first bit line to or from the second internal node.

6. The semiconductor device of claim 5, wherein the control circuit generates a first data transfer signal for controlling the first transistor, a second data transfer signal for controlling the second transistor, a first compensation signal for controlling the third transistor, and a second compensation signal for controlling the fourth transistor, on the basis of an active signal.

7. The semiconductor device of claim 5, wherein the control circuit controls enable timing of the first data transfer signal to be different from enable timing of the second data transfer signal, and controls disable timing of the first compensation signal to be different from disable timing of the second compensation signal on the basis of an active signal.

8. The semiconductor device of claim 7,
   wherein the control circuit generates the first and second data transfer signals and controls different times at which the first and second transistors are turned on, and
   wherein the control circuit generates the first and second compensation signals and controls different times at which the third and fourth transistors are turned off.

9. A semiconductor device comprising:
   a sense amplifier configured to perform an amplification operation of amplifying a difference in voltages between a first bit line and a second bit line and a mismatch compensation operation; and
   a control circuit configured to control each of the first and second bit lines to be disconnected from the sense amplifier at different timings during the mismatch compensation operation,
   wherein the control circuit is configured to control each of the first and second bit lines to be connected to the sense amplifier at different timings during the amplification operation.

10. The semiconductor device of claim 9, wherein the sense amplifier is activated and performs the mismatch compensation operation before a word line is enabled, and is activated again and performs the amplification operation when the word line is enabled.

11. The semiconductor device of claim 10, wherein the sense amplifier includes:
    a first internal node connected to one of the first and second bit lines; and
    a second internal node connected to the other one of the first and second bit lines.

12. The semiconductor device of claim 11, wherein the control circuit controls timing at which the first internal node is disconnected from the first bit line to be different from timing at which the second internal node is disconnected from the second bit line during the mismatch compensation operation.

13. The semiconductor device of claim 12, wherein the control circuit controls timing at which the first internal node is connected to the second bit line to be different from timing at which the second internal node is connected to the first bit line during the amplification operation.

14. The semiconductor device of claim 13, wherein the sense amplifier includes:
    a first transistor configured to connect or disconnect the first bit line to or from the second internal node;
    a second transistor configured to connect or disconnect the second bit line to or from the first internal node;
    a third transistor configured to connect or disconnect the first bit line to or from the first internal node; and
    a fourth transistor configured to connect or disconnect the first bit line to or from the second internal node.

15. The semiconductor device of claim 14, wherein the control circuit turns off the third and fourth transistors at different timings during the mismatch compensation operation.

16. The semiconductor device of claim 14, wherein the control circuit turns on the first and second transistors at different timings during the amplification operation.

17. An operating method of a semiconductor device, comprising:
    activating a sense amplifier while a word line is disabled;
    disconnecting each of a first bit line and a second bit line from the sense amplifier at different timings;

activating the sense amplifier again while the word line is enabled; and connecting each of the first and second bit lines to the sense amplifier at different timings.

18. The operating method of claim 17, wherein the disconnecting of each of the first and second bit lines from the sense amplifier at different timings includes controlling a bit line connected to a transistor having first characteristics to be disconnected from the sense amplifier earlier than a bit line connected to a transistor having second characteristics among transistors constituting the sense amplifier, and wherein the first characteristics are different from the second characteristics.

* * * * *